US007895175B2

(12) United States Patent
Kumar

(10) Patent No.: US 7,895,175 B2
(45) Date of Patent: Feb. 22, 2011

(54) CLIENT-SIDE FEDERATED SEARCH

(75) Inventor: Amit Kumar, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 128 days.

(21) Appl. No.: 11/600,345

(22) Filed: Nov. 15, 2006

(65) Prior Publication Data

US 2008/0114731 A1   May 15, 2008

(51) Int. Cl.
G06F 17/30 (2006.01)
(52) U.S. Cl. .............................. 707/706; 707/707
(58) Field of Classification Search ................. 707/706, 707/707
See application file for complete search history.

(56) References Cited

U.S. PATENT DOCUMENTS

| | | | |
|---|---|---|---|
| 6,519,587 B1 * | 2/2003 | Blinn et al. | 707/623 |
| 6,671,681 B1 * | 12/2003 | Emens et al. | 707/706 |
| 6,694,307 B2 * | 2/2004 | Julien | 707/706 |
| 6,721,736 B1 * | 4/2004 | Krug et al. | 707/634 |
| 6,725,217 B2 * | 4/2004 | Chow et al. | 707/706 |
| 6,732,092 B2 * | 5/2004 | Lucas et al. | 707/706 |
| 6,782,383 B2 * | 8/2004 | Subramaniam et al. | 707/706 |
| 6,785,670 B1 * | 8/2004 | Chiang et al. | 707/706 |
| 6,801,906 B1 * | 10/2004 | Bates et al. | 707/707 |
| 7,031,954 B1 * | 4/2006 | Kirsch | 707/731 |
| 7,103,594 B1 * | 9/2006 | Wolfe | 707/706 |
| 2005/0071224 A1 * | 3/2005 | Fikes et al. | 705/14 |
| 2006/0155728 A1 * | 7/2006 | Bosarge | 707/100 |
| 2007/0088680 A1 * | 4/2007 | Sauve et al. | 707/3 |
| 2007/0168331 A1 * | 7/2007 | Reddy et al. | 707/3 |
| 2007/0174273 A1 * | 7/2007 | Jones et al. | 707/5 |
| 2007/0185841 A1 * | 8/2007 | Jones et al. | 707/3 |
| 2007/0260520 A1 * | 11/2007 | Jha et al. | 705/14 |

OTHER PUBLICATIONS

Wikipedia, "Ajax (programming)," located on the internet at http://en.wikipedia.org/wiki/AJAX, retrieved on Jan. 10, 2007, 6 pages.
Goggle Co-Op, "Custom Search Engine," Google 2007, located on the internet at http://www.google.com/coop/cse/, retrieved in Jan. 10, 2007, 1 page.

(Continued)

*Primary Examiner*—Don Wong
*Assistant Examiner*—Kim T Nguyen
(74) *Attorney, Agent, or Firm*—Hickman Palermo Truong & Becker LLP

(57) ABSTRACT

A method and apparatus for client-side federated search is provided. The user subscribes to a number of information providers, wherein a list of the information providers for the user is stored at a search engine. When the user at a client device submits a search query to the search engine, the search engine responds by sending general search results to the client device, along with search instructions that instruct the client device how to automatically initiate a search at information providers in which the user is interested. Without any further input from the user, the client device uses the search instructions to initiate searches at information providers in which the user is interested. When the client receives search results from the information providers, the client device displays the general search results concurrently with the information provider search results.

27 Claims, 5 Drawing Sheets

OTHER PUBLICATIONS

Yahoo!, "Yahoo! Search Subscriptions," Yahoo! Inc. 2007, located on the internet at http://search.yahoo.com/subscriptions, retrieved on Jan. 10, 2007, 1 page.

Yahoo!, "Yahoo! Directory RSS Feeds," Yahoo! Inc. 2007, located on the internet at <http://dir.yahoo.com/rss/dir/index.php>, retrieved on Jan. 10, 2007, 3 pages.

* cited by examiner

CLIENT-SIDE FEDERATED SEARCH

FIELD OF THE INVENTION

The present invention relates to computer systems, and more particularly to a client-side federated search.

BACKGROUND

A search engine returns search results that match a search query submitted by a user. Typically, the search engine orders the search results. The order usually takes the form of a "ranking", where the document with the highest ranking is the document considered most likely to satisfy the interest reflected in the search criteria specified by the user. Once the matching documents have been determined, and the display order of those documents has been determined, the search engine sends to the user that issued the search a "search results page" that presents information about the matching documents in the selected display order. Typically, the number of documents that match a search is so large that the user is presented with a search results page that only displays information about the top N ranking documents, where N may be significantly smaller than the total number of matching documents. The search results page typically includes a control that allows the user to retrieve information about the "next N" matching documents, in case the first N matching documents do not entirely satisfy the user's interest.

Unfortunately, the user search results that have the highest ranking may not correlate well with the search results in which a particular user is interested. Thus, a user might have to wade through many pages of search results to locate results of interest. Worse yet, the results in which a particular user is interested might have such a low ranking that the user does not find them at all.

A potential reason why the search results are not satisfactory for the user is that many search engines attempt to search the entire World Wide Web. However, not all searches cover the entire World Wide Web. In a federated search, the search engine relays query terms that were provided by the user on to other data sources. Those data sources provide search results, which the search engine aggregates and filters before sending on to the user. Thus, a federated search can potentially be more relevant to the user, especially if the user has some control over the data sources that are searched.

However, a limitation of federated searches is that the search engine is required to have access to the data sources. However, some of the most pertinent search results may be on data sources that are inaccessible to the federated search engine.

In view of the foregoing, improved techniques are needed for providing a user with search results that are relevant to the particular user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
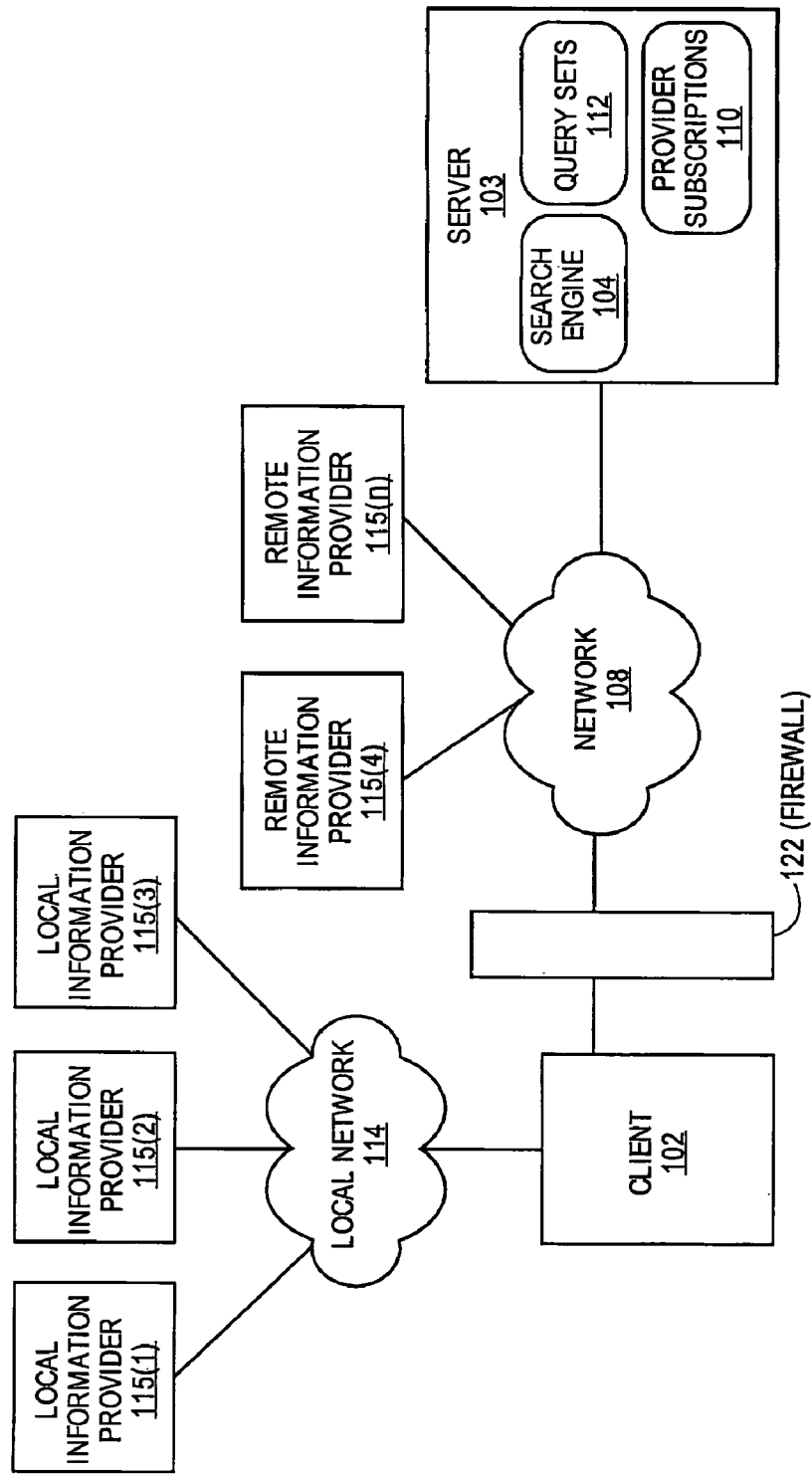
FIG. 1 illustrates a system for client-side federated search, in accordance with an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Often, a search query submitted by a particular user can be satisfied for that particular user by performing a search of specific websites or databases that are of interest to the particular user. As an example, a user that is a movie buff might specifically be interested in search results from a particular movie review website. Moreover, the user might, at the same time, wish to view search results from a more general search of the World Wide Web. As another example, a user might wish to view search results from the World Wide Web, along with search results from one or more databases that are inaccessible to search engines that search the World Wide Web.

Techniques are disclosed herein for a user to enrich their search experience by subscribing to information providers that interest them, and receiving, in response to submitting a single search query, search results from one or more of the information providers, as well as general search results that are not specifically tailored to the user. By general search results it is meant that the search results are not specifically directed to information providers that the user has selected.

In one embodiment, the user subscribes to a number of information providers, wherein a list of the information providers for the user is stored at a search engine. When the user at a client device submits a search query to the search engine, the search engine responds by sending general search results to the client device, along with search instructions that instruct the client device how to automatically initiate a search at information providers in which the user is interested. As an example, the search instructions might be a small piece of executable code. Without any further input from the user, the client device uses the search instructions to initiate searches at information providers in which the user is interested. When the client receives search results from the information providers, the client device displays the general search results concurrently with the information provider search results.

Note that, by submitting a single search query, the user receives search results that are highly pertinent to the user. Further note that, because the client device may initiate the searches at the information providers and may receive search results directly therefrom, the information providers can be in the same secure environment with the client, although this is not required. In other words, the search engine does not need to access information stored on the information providers to produce information provider search results. Thus, sensitive provider information does not need to be shared with the search engine.

System for Client Side Federated Search

FIG. 1 illustrates a system for client-side federated search, in accordance with an embodiment of the present invention. The client 102 is communicatively coupled to the server 103 via network 108. Network 108 may be the Internet, although this is not required. The server 103 has search engine 104 that is able to perform a search of the World Wide Web, in one embodiment. The client 102 is communicatively coupled to local information providers 115(1)-115(3) via local network 114. A local information provider (e.g., 115(1)) might access a company database, for example. The client 102 is communicatively coupled to remote information providers 115(4)-115(n) via network 108. A particular remote information provider 115 might be a web site, although this is not required. A user at client 102 is able to obtain general search results from the search engine 104 and search results from various information providers 115, and display the search results concurrently.

The client 102 and local information providers 115(1)-115(3) are behind a firewall 122. The firewall 122 may prevent the search engine 104 from accessing information at local information providers 115(1)-115(3). Therefore, the search engine 104 may not be able to perform a search for provider information at those providers 115(1)-115(3). The search engine 104 is able to provide the client 102 with provider search instructions that may cause the client 102 to automatically initiate searches at local information providers 115(1)-115(3). The search instructions may also cause the client 102 to automatically initiate a search at remote information providers 115(n). However, the search instructions do not necessarily cause the client 102 to initiate a search at all of the information providers 115(1)-115(n). Rather, the search instructions are for the subset of information providers 115 that the user subscribed to that are pertinent to a search query submitted by the user, in one embodiment.

In order to determine which information providers 115 are appropriate for the particular user, the server 103 stores information provider subscriptions 110. The information provider subscriptions 110 contain a set of information providers that each user has "subscribed to". For example, if a user is interested in movie reviews from a particular website, the user might go to that website and select a "subscribe button". However, other techniques could be used.

The server 103 stores query sets 112 to help determine which information providers 115 are appropriate for a particular search query. The query sets 112 are constructed from data, such as keywords, sent from information providers 115. As an example, an information provider 115 sends a list of movie titles to the search engine.

Search Instructions

The search engine 104 returns a set of search instructions for each information provider 115 for which a search is to be initiated ("selected information providers"), in one embodiment. In one embodiment, the search instructions comprise executable code. As an example, the search engine 104 returns a page of general search results along with executable code associated with the web page. In one embodiment, the search engine 104 returns a web page with search results and a java script for each selected information provider.

In another embodiment, the search instructions comprise a data structure. In this embodiment, the client 102 has executable code stored thereon that reads the data structure and responds thereto by initiating searches at the selected information providers 115.

Example Web Page

Figure 2:
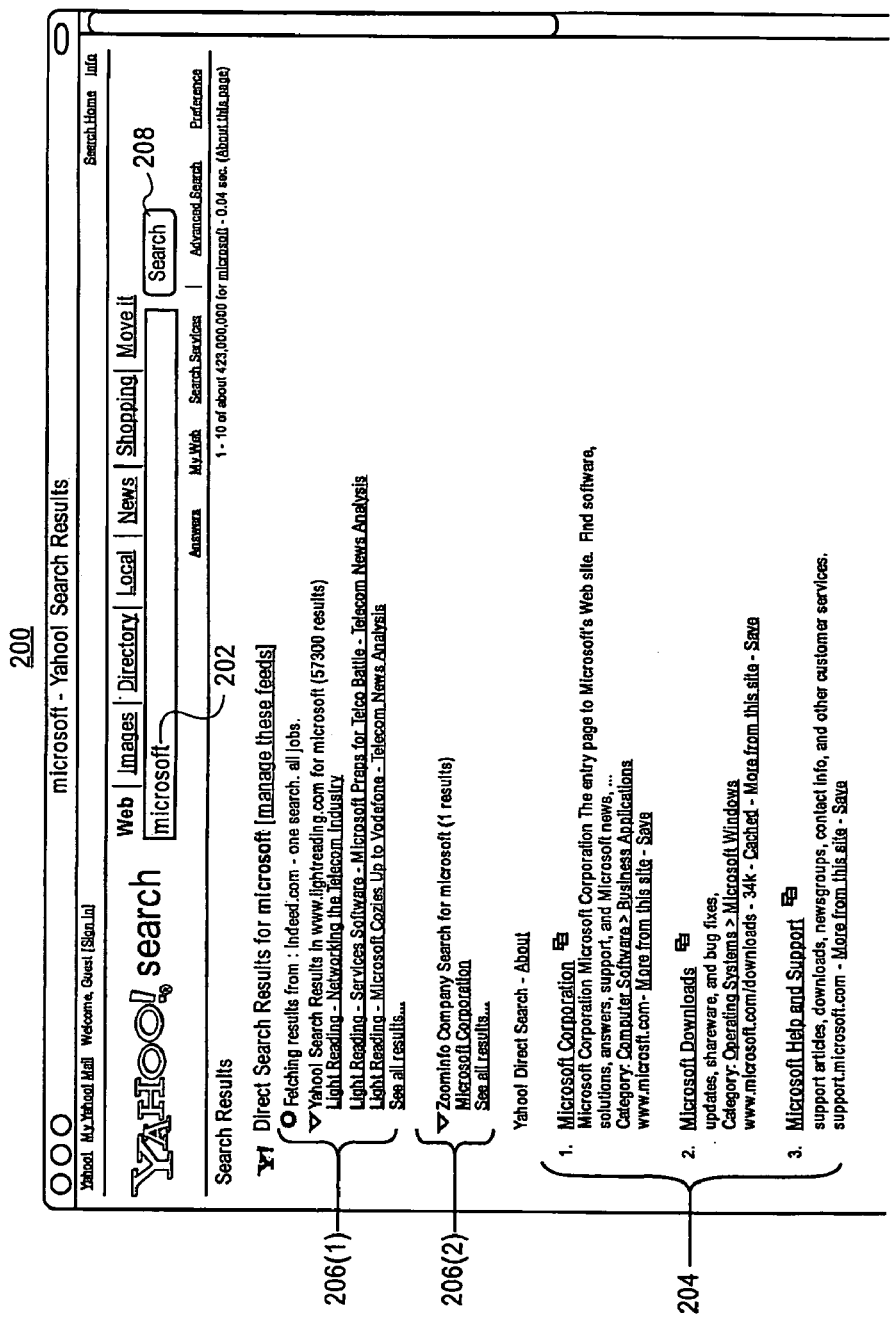
FIG. 2 is an example page of search results from a search engine and search results from information providers, in accordance with an embodiment of the present invention.

FIG. 2 is an example page 200 of general search results from a search engine and search results from information providers, in accordance with an embodiment of the present invention. The example page 200 contains general search results 204 and information provider search results 206(1), 206(2). All search results 204, 206 are automatically provided in the page 200 in response to the user submitting the search query 202 by selecting the search button 208. Note that information provider search results 206(1) are in the process of being received from the information provider, whereas other search results 204, 206(2) have already been received. Thus, the client can render search results as they are received.

Process Flow

Figure 3:
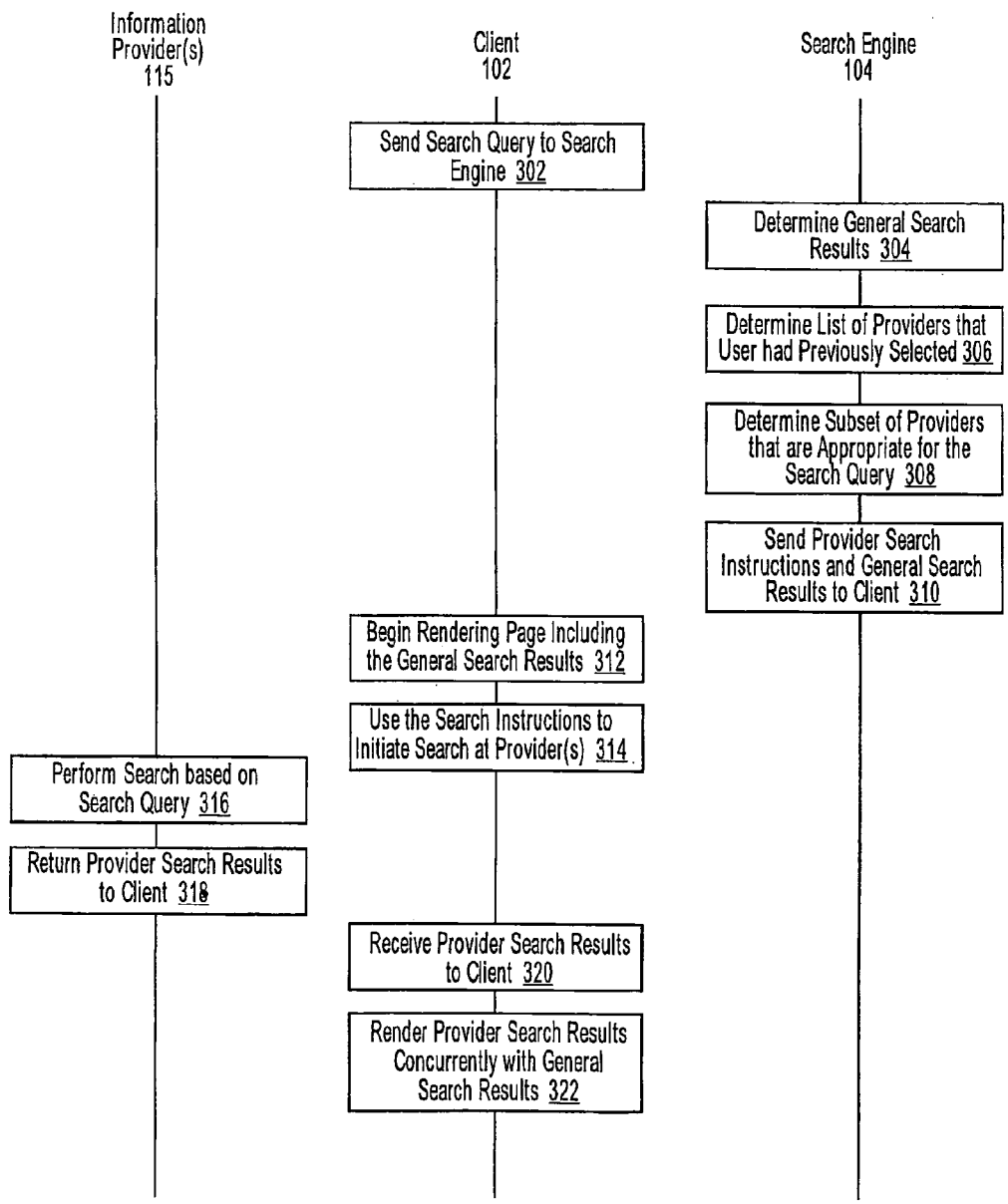
FIG. 3 is a flowchart illustrating client-side federated search, in accordance with an embodiment of the present invention.

FIG. 3 is a flowchart illustrating a process of client-side federated search, in accordance with an embodiment of the present invention. FIG. 3 will be described with reference to the system 100 of FIG. 1 and the example web page 200 of FIG. 2. However, the process of FIG. 3 is neither limited to system 100, nor to example web page 200. In step 302, the client 102 sends a search query to the search engine 104, in response to user input at the client 102. For example, the user enters the search query "Microsoft" and submits the search query by selecting the search button 208.

In step 304, the search engine 104 determines general search results. In step 306, the search engine 104 determines a list of information providers that the user has previously selected. The search engine 104 accesses the information provider subscriptions 110 to make this determination, in one embodiment.

In step 308, the search engine determines a subset of the information providers that are appropriate for the search query. For example, if the search query is related to a movie title, then an information provider that provides movie reviews might be appropriate. However, an information provider that provides financial information might not be appropriate. Since the client device 102 will automatically initiate a search at the information providers, filtering out information providers can reduce the need to display less relevant search results on the web page 200. The search engine 104 accesses the query sets 112 to filter out less appropriate information providers, in one embodiment.

In step 310, the search engine 104 sends search instructions that the client 102 can use to automatically initiate searches at information providers. The search instructions are executable code, in one embodiment. The search instructions are a data structure, in another embodiment. The search engine 104 also sends the general search results to the client. In one embodiment, the search engine 104 sends documents, such as a web page, having the general search results and executable code that the client can use to automatically initiate searches at the information providers 115.

After the client 102 receives the general search results and the search instructions corresponding to each of a plurality of information providers, the client 102 begins to render a web page that includes the general search results, in step 312. Note that step 312 can be performed prior to receiving information provider search results. Moreover, the client 102 may begin to render the web page 102 prior to initiating the searches at the information providers 115, although this is not required.

In step 314, without receiving any additional user input at the client, the client 102 automatically uses the search instructions to initiate searches at the information providers 115 for which search instructions were provided.

The information providers 115 perform the searches and return the information provider search results to the client 102, in steps 316 and 318, respectively.

In step 320, the client 102 receives search results from at least one of the information providers 115. Upon receiving the information provider search results, the client 102 renders the information provider search results concurrently with the general search results, in step 322. Note that the various information providers 115 may perform their searches in parallel. Therefore, the overall provider search time is reduced as compared to a serial search at the various providers. Also note that the client 102 does not need to wait until search results are received from all information providers in order to begin rendering information provider search results.

Alternative Process Flow

Figure 4:
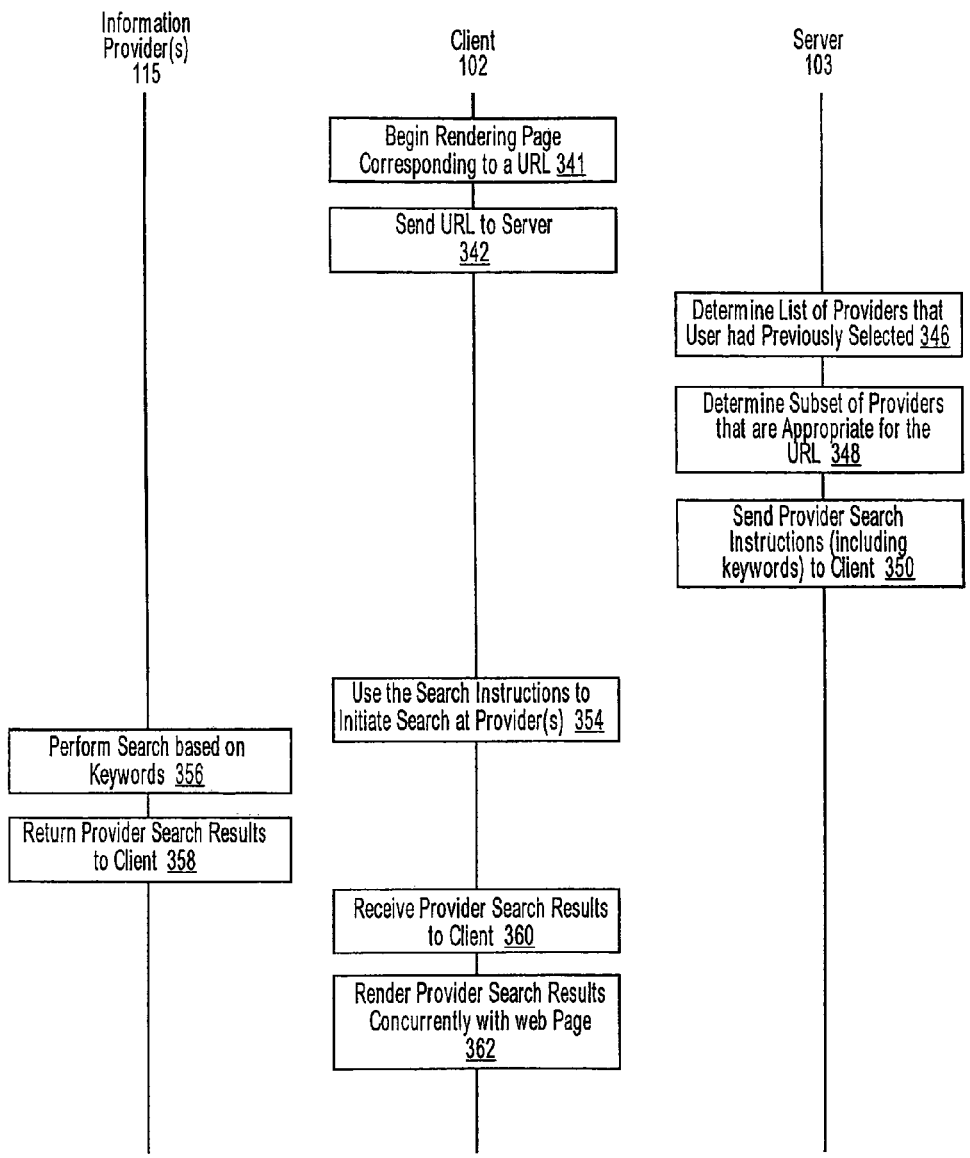
FIG. 4 is a flowchart illustrating client-side federated search, in accordance with another embodiment of the present invention.

FIG. 4 illustrates a process of client-side federated search, in accordance with another embodiment of the present invention. In step 341, the client 102 begins to render a web page. As an example, a user logs into a home page that displays various information, such as news stories. The web page has associated with it executable code that automatically sends the web page URL to a specific server, in one embodiment. In step 342, the client 102 sends the URL of the web page to a server 103. Thus, the URL is sent to the server 103 without requiring any user action after the web page begins to load. The server 103 might have a search engine 104; however, the server 103 is not required to have a search engine 104.

In step 346, the server determines which information providers the user has previously selected. In step 348, the server determines which of the user-selected information providers are appropriate for the URL. Step 348 is optional. The server 103 performs a comparison between a data set based on the web page associated with the URL with data sets associated with the information providers previously selected by the user, in one embodiment. For example, previously the server stored keywords, or the like, which reflect the content of the web page associated with the URL. The server 103 may compare these keywords with the query sets 112, or other information provider data. In step 350, the server 103 sends information provider search instructions to the client 102.

In step 354, the client 102 uses the search instructions to initiate searches at the information providers 115. The searches are to be based on the content of the web page, in one embodiment. The information providers 115 perform the searches and return information provider search results to the client 102, in steps 356 and 358, respectively. In step 360, the client 102 receives the information provider search results, and in step 362, the client 102 renders the information provider search results concurrently with the web page.

As a particular example of the process of FIG. 4, prior to the client even sending the URL of the web page to the server, the server might extract keywords from a portion of the web page that contains a news story that contains content about a particular country. Thus, the keywords for the news story might include the name of the particular country. The user might have previously selected, as information providers, an online encyclopedia, and an online bookseller, as well as other information providers. The server sends the keywords (e.g., country name) to the client, as part of the search instructions. The client 102 uses the search instructions to initiate a search at the online encyclopedia and online bookseller for information pertaining to the particular country. Upon receiving the search results, the client 102 renders, in the web page, a link to an online encyclopedia article about the particular country, and a link to books for sale about the country.

Hardware Overview

Figure 5:
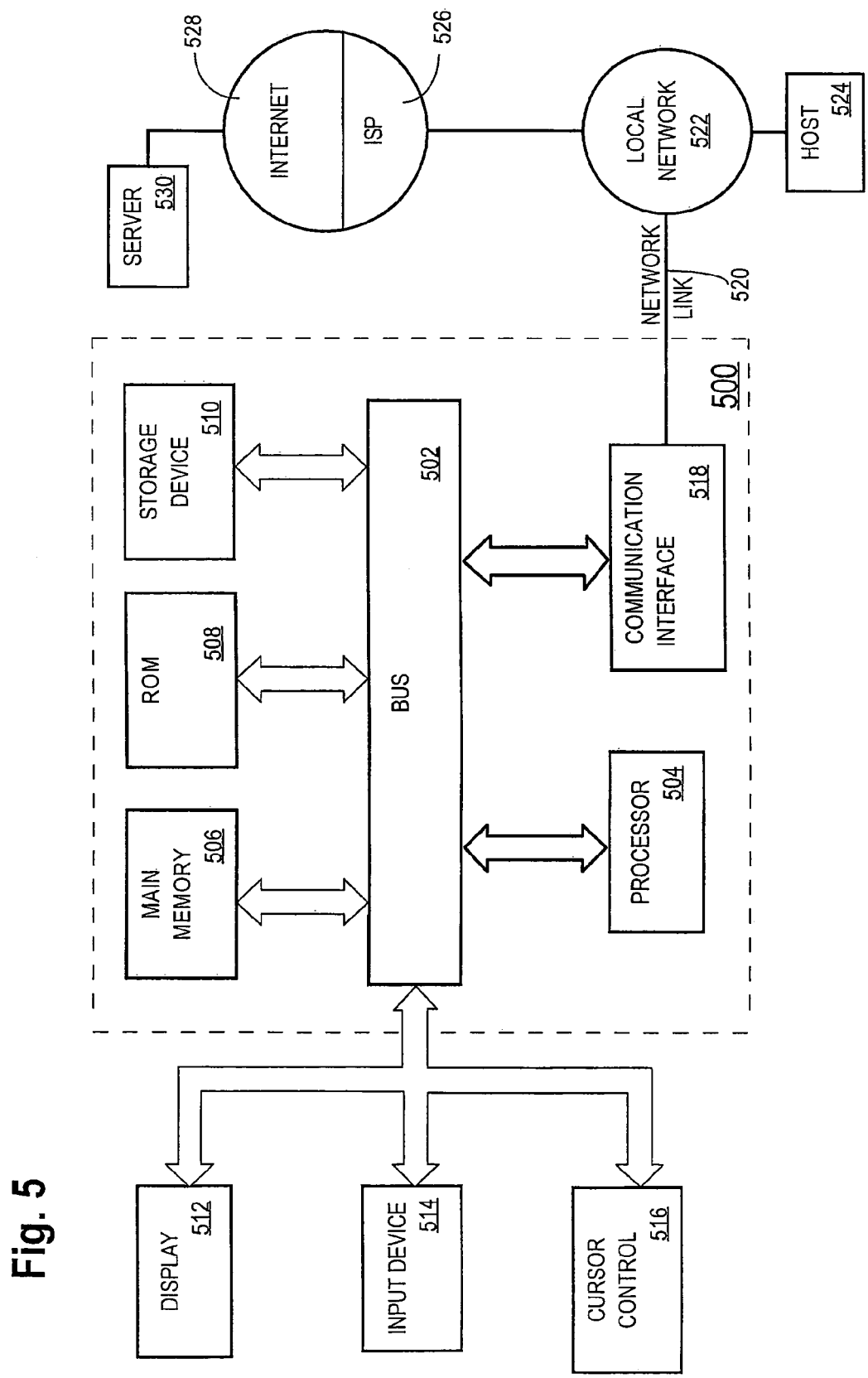
FIG. 5 is a block diagram that illustrates a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising steps of:
    in response to user input, sending a search query from a client to a search engine;
    receiving from the search engine in response to the search query, at the client, (a) search results matching the search query and (b) search instructions corresponding to each of a plurality of information providers;
    wherein at least one information provider of the plurality of information providers has certain information that is not accessible to the search engine;
    without receiving any additional user input at the client, in response to receiving the search instructions, the client automatically using the search instructions to initiate searches by submitting search queries to the plurality of information providers without receiving any additional user input;
    wherein the client automatically using the search instructions to initiate searches at each of the information providers comprises initiating a search for said certain information, that is not accessible to the search engine, in said at least one information provider;
    receiving, at the client, search results from each of the information providers; and
    displaying concurrently, on the client, the search results from the search engine and the search results from each of the information providers;
    wherein the steps of the method are performed by one or more computing devices.

2. The method of claim 1, wherein the search instructions comprise executable instructions and the step of automatically using the search instructions comprises executing the instructions to initiate searches at each of the information providers.

3. The method of claim 1, wherein the search instructions comprise a data structure and the step of automatically using the search instructions comprises using the data structure to initiate searches at each of the information providers.

4. The method of claim 1, wherein the step of displaying comprises displaying, on the client, the search results from the search engine and the search results from each of the information providers in the same document on the client.

5. The method of claim 1, wherein the search instructions are for information providers previously associated with a user that is using the client.

6. A method comprising steps of:
- receiving, at a client from a server separate from the client, search instructions corresponding to at least one of a plurality of information providers that have previously been selected by a user that is using said client as information providers at which searches are to be performed;
- wherein at least one information provider of the plurality of information providers has certain information that is not accessible to the server;
- in response to receipt of the search instructions at the client, the client automatically using the search instructions to initiate searches by submitting search queries to the plurality of information providers without receiving any additional user input;
- wherein the client automatically using the search instructions to initiate searches at each of the information providers comprises initiating a search for said certain information, that is not accessible to the server, in said at least one information provider;
- receiving, at the client, search results from each of the information providers; and
- displaying concurrently, on the client, a web page and the search results from each of the information providers;
- wherein the steps of the method are performed by one or more computing devices.

7. The method of claim 6, wherein the search instructions comprise executable instructions and the step of automatically using the search instructions comprises executing the instructions to initiate searches at each of the information providers.

8. The method of claim 6, wherein the search instructions comprise a data structure and the step of automatically using the search instructions comprises using the data structure to initiate searches at each of the information providers.

9. The method of claim 6, wherein the search instructions correspond to information providers that match the web page.

10. A computer-readable non-transitory storage medium storing one or more sequences of instructions, which when executed by one or more processors causes the one or more processors to perform the steps of:
- in response to user input, sending a search query from a client to a search engine;
- receiving from the search engine in response to the search query, at the client, (a) search results matching the search query and (b) search instructions corresponding to each of a plurality of information providers;
- wherein at least one information provider of the plurality of information providers has certain information that is not accessible to the search engine;
- without receiving any additional user input at the client, in response to receiving the search instructions, the client automatically using the search instructions to initiate searches by submitting search queries to the plurality of information providers without receiving any additional user input;
- wherein the client automatically using the search instructions to initiate searches at each of the information providers comprises initiating a search for said certain information, that is not accessible to the search engine, in said at least one information provider;
- receiving, at the client, search results from each of the information providers; and
- displaying concurrently, on the client, the search results from the search engine and the search results from each of the information providers.

11. The computer-readable storage medium of claim 10, wherein the one or more sequences of instructions, which when executed by the one or more processors cause the one or more processors to perform the step of displaying comprise one or more sequences of instructions, which when executed by the one or more processors cause the one or more processors to perform the step of:
- displaying, on the client, the search results from the search engine and the search results from each of the information providers in the same document on the client.

12. A computer-readable non-transitory storage medium storing one or more sequences of instructions, which when executed by one or more processors causes the one or more processors to perform the steps of:
- receiving, at a client from a server separate from the client, search instructions corresponding to at least one of a plurality of information providers that have previously been selected by a user that is using said client as information providers at which searches are to be performed;
- wherein at least one information provider of the plurality of information providers has certain information that is not accessible to the server;
- in response to receipt of the search instructions at the client, the client automatically using the search instructions to initiate searches by submitting search queries to the plurality of information providers without receiving any additional user input;
- wherein the client automatically using the search instructions to initiate searches at each of the information providers comprises initiating a search for said certain information, that is not accessible to the server, in said at least one information provider;
- receiving, at the client, search results from each of the information providers; and
- displaying concurrently, on the client, a web page and the search results from each of the information providers.

13. A method comprising steps of:
- receiving at a search engine a search query from a client;
- in response to receiving the search query, the search engine sending, to the client, search results matching the search query and search instructions corresponding to each of a plurality of information providers, wherein the search instructions are able to cause the client to automatically initiate searches at each of the information providers without receiving any additional user input, and to display concurrently, on the client, the search results from the search engine and search results from each of the information providers;
- wherein at least one information provider of the plurality of information providers has certain information that is not accessible to the search engine;
- wherein the search instructions are further able to cause the client to automatically initiate a search for said certain information, that is not accessible to the search engine, in said at least one information provider;
- wherein the steps of the method are performed by one or more computing devices.

14. The method of claim 13, wherein the search instructions comprise executable instructions.

15. The method of claim 13, wherein the search instructions comprise a data structure.

16. The method of claim 13, further comprising:
- receiving an identifier of a user that is using the client;
- determining a list of information providers associated with the identifier; and
- selecting said at least one information provider from the list as an information provider for which search instructions are to be sent to the client.

17. The method of claim 13, wherein selecting at least one information provider comprises selecting information providers that have provided keywords that match the search query.

18. A method comprising steps of:
receiving, at a server, from a client, a web page identifier of a web page;
identifying a user that is using the client; and
in response to receiving the web page identifier, the server sending, to the client, search instructions corresponding to at least one of a plurality of information providers that have previously been selected by the user; wherein the search instructions are able to cause the client to automatically initiate separate searches at each of the information providers without receiving any additional user input, and to display concurrently, on the client, the web page and search results from each of the information providers;
wherein at least one information provider of the plurality of information providers has certain information that is not accessible to the server;
wherein the search instructions are further able to cause the client to automatically initiate a search for said certain information, that is not accessible to the server, in said at least one information provider;
wherein the steps of the method are performed by one or more computing devices.

19. The method of claim 18, further comprising:
based on information that is representative of content of the web page, determining a set of information providers that are relevant to the web page; and
selecting, as information providers for which search instructions are to be sent to the client, information providers that are both relevant to the web page and that have previously been selected by the user.

20. The method of claim 18, wherein selecting information providers that are relevant to the web page comprises matching keywords associated with respective ones of the information providers with keywords extracted from the web page.

21. The method of claim 18, wherein the search instructions comprise executable instructions.

22. The method of claim 18, wherein the search instructions comprise a data structure.

23. A system comprising:
a search engine that is operable to:
receive a search query from a client;
identify a user that is using the client; and
send, to the client, search instructions corresponding to at least one of a plurality of information providers that have previously been selected by the user;
wherein at least one information provider of the plurality of information providers has certain information that is not accessible to the search engine; and
a client communicatively coupled to the search engine, wherein the client is operable to:
in response to user input, send a search query to the search engine;
without receiving any additional user input at the client, in response to receiving the search instructions, automatically use the search instructions to initiate searches by submitting search queries to the plurality of information providers without receiving any additional user input;
wherein the client is operable to initiate a search for said certain information, that is not accessible to the search engine, in said at least one information provider;
receive, at the client, search results from each of the information providers; and
concurrently display the search results from the search engine and the search results from each of the information providers.

24. The system of claim 23, wherein the search engine is operable to select information providers that have provided query triggers that match the search query.

25. The system of claim 23, further comprising:
a firewall between said at least one information provider of the plurality of information providers and the search engine, wherein the search engine is unable to access the certain information on said at least one information provider that the client is able to access; and
wherein the client is on the same side of the firewall as said at least one information provider such that the client is able to initiate a search for the certain information on said at least one information provider.

26. A computer-readable non-transitory storage medium storing one or more sequences of instructions which, when executed by one or more processors, cause the one or more processors to perform the steps of claim 13.

27. A computer-readable non-transitory storage medium storing one or more sequences of instructions which, when executed by one or more processors, cause the one or more processors to perform the steps of claim 18.

* * * * *